(12) United States Patent
Alshawabkeh et al.

(10) Patent No.: US 12,475,030 B2
(45) Date of Patent: Nov. 18, 2025

(54) GLOBAL MEMORY SEGMENTATION ADJUSTMENT

(71) Applicant: Dell Products, L.P., Hopkinton, MA (US)

(72) Inventors: Malak Alshawabkeh, Franklin, MA (US); Ramesh Doddaiah, Westborough, MA (US); Kaustubh Sahasrabudhe, Westborough, MA (US)

(73) Assignee: Dell Products, L.P., Hopkinton, MA (US)

( * ) Notice: Subject to any disclaimer, the term of this patent is extended or adjusted under 35 U.S.C. 154(b) by 54 days.

(21) Appl. No.: 18/401,644

(22) Filed: Jan. 1, 2024

(65) Prior Publication Data
US 2025/0217276 A1    Jul. 3, 2025

(51) Int. Cl.
*G06F 12/02*    (2006.01)
*G06F 3/06*    (2006.01)

(52) U.S. Cl.
CPC ............ *G06F 12/023* (2013.01); *G06F 3/061* (2013.01); *G06F 3/0656* (2013.01); *G06F 3/067* (2013.01)

(58) Field of Classification Search
CPC ...... G06F 12/023; G06F 3/0656; G06F 3/061; G06F 3/067
See application file for complete search history.

(56) References Cited

U.S. PATENT DOCUMENTS

2006/0212667 A1* 9/2006 Mikami .............. G06F 12/0868
  714/E11.107
2006/0212668 A1* 9/2006 Furukawa ........... G06F 11/2064
  714/E11.107

* cited by examiner

*Primary Examiner* — Kalpit Parikh
(74) *Attorney, Agent, or Firm* — Anderson Gorecki LLP

(57) ABSTRACT

Two storage arrays implement a Remote Data Replication (RDR) facility between a primary storage array and a backup storage array. The primary storage array collects global memory usage statistics by host processes on the primary array and global memory usage by the RDR process on the primary array. The backup storage array collects global memory usage statistics by host processes on the backup array and global memory usage by the RDR process on the backup array. The primary storage array transmits information about the global memory usage by the RDR process on the primary array to the backup array. The backup storage array transmits information about the global memory usage by the RDR process on the backup array to the primary array. Both arrays use global memory usage statistics by their respective local host process and the RDR process on both arrays, to locally set global memory segmentation policies.

18 Claims, 5 Drawing Sheets

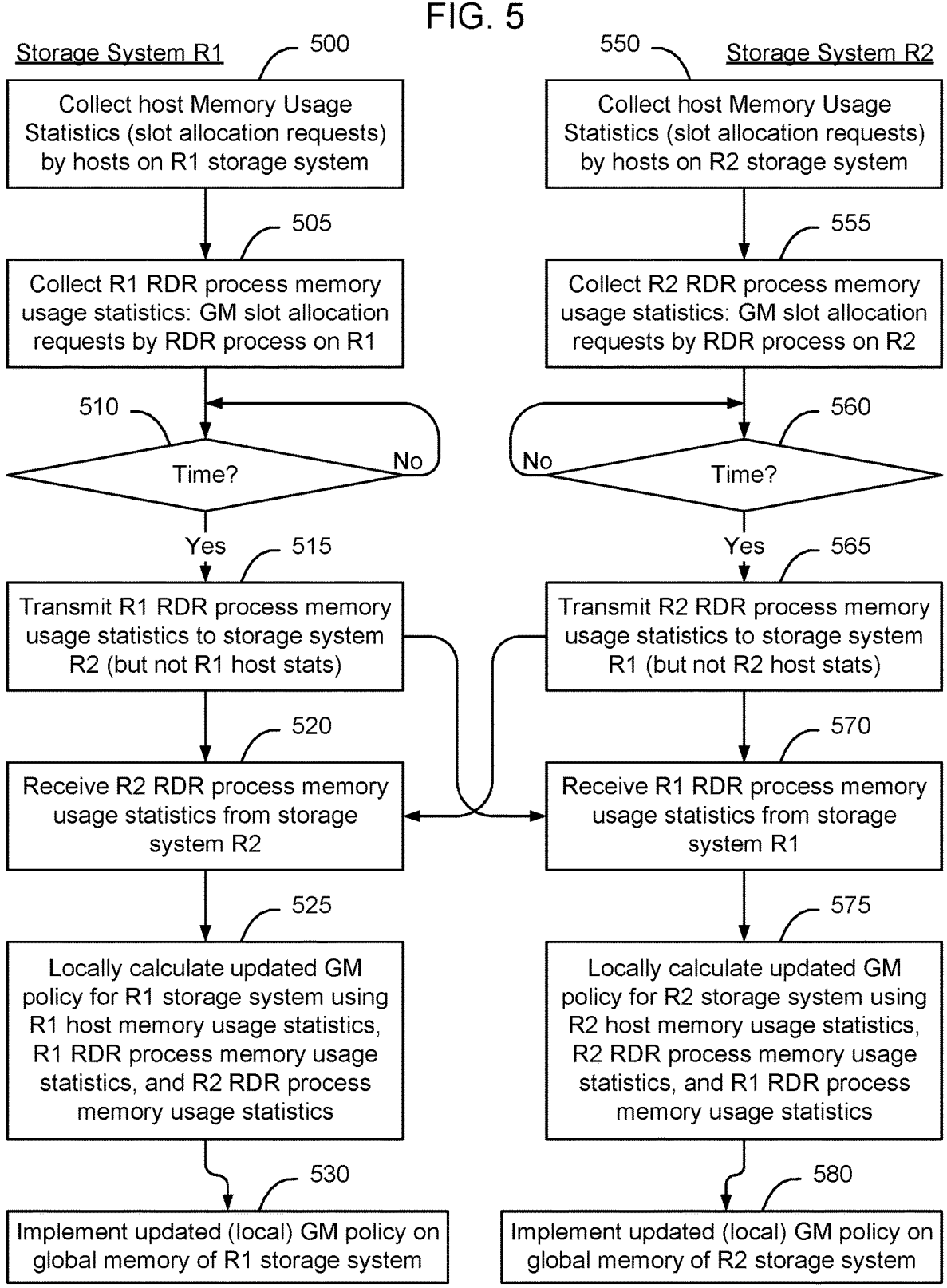

GLOBAL MEMORY SEGMENTATION ADJUSTMENT

FIELD

This disclosure relates to computing systems and related devices and methods, and, more particularly, to a method and apparatus for storage array global memory segmentation adjustment incorporating remote data replication process workload requirements on both arrays of a remote data replication facility.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for storage array global memory segmentation adjustment incorporating remote data replication process workload requirements on both arrays of a remote data replication facility is provided. In some embodiments, global memory of a storage system is segmented into a mirrored policy region and an unmirrored policy region. The mirrored policy region is used to hold new data that is presented to the storage system in connection with host write IO operations. The read policy region is used to hold old data that is being provided by the storage system to hosts in connection with host read IO operations. Within each policy region, the global memory is divided into IO pools, in which each IO pool is used to implement slots of global memory having a given slot size. Example slot sizes might include 16 KB, 32 KB, 64 KB, and 128 KB, although the particular slot sizes of a set of IO pools will depend on the particular implementation.

A global memory management system applies a dynamic global memory segmentation policy to the global memory to optimize use of global memory. For example, at time T1 the global memory segmentation policy might require that 40% of the global memory be used to implement the mirrored policy region, and 60% of the global memory be used to implement the unmirrored policy region. At time T2 the global memory segmentation policy might change such that 50% of the global memory is used to implement each policy region. Global memory segmentation policy changes can also affect the size of each of the IO pools within a given policy region, for example based on the relative proportion of the sizes of IO operations that are expected to be implemented on global memory during an upcoming processing period.

Two storage arrays (primary storage array and backup storage array) may be configured to implement a remote data replication facility, in which data of a primary storage array is forwarded as it is received to the backup storage array. According to some embodiments, both storage arrays implementing a remote data replication facility collect global memory usage statistics of host processes as well as IO operations of respective RDR processes implementing the remote data replication facility. Global memory usage statistics associated with the IO operations of the RDR process on the primary storage array are periodically transmitted to the backup storage array, and global memory usage statistics associated with the IO operations of the RDR process on the backup storage array are periodically transmitted to the primary storage array. Both the primary storage array and backup storage array use the combination of local host IO operations on the respective storage array, and GM usage statistics associated with IO operations by the RDR processes on both the primary and backup storage array to calculate global memory segmentation policies to be applied to their local global memory. The global memory segmentation policies locally specify the relative proportion of global memory that should be used to implement each of the policy regions (mirrored and unmirrored) as well as the size of the IO pools within each of the policy regions on the local storage array.

By including global memory usage statistics associated with IO operations of the RDR process on both the primary storage array and backup storage array, as well as the global memory usage statistics associated with local host process IO operations, it is possible to dynamically optimize the configuration of global memory of both the primary and backup arrays based on the local host and RDR workload patterns at the same time. Accordingly, in the event of a failover or failback on the RDR facility, the global memory segmentation policy in place on both of the storage arrays will be more optimized to enable the new primary storage array (after failover/failback) to assume responsibility for the work on the storage volumes associated with the RDR facility.

In some embodiments, a method of global memory segmentation adjustment incorporating remote data replication process workload requirements of a Remote Data Replication (RDR) facility, the RDR facility including a primary storage array and a backup storage array, the method includes collecting, at the primary storage array, primary array host process IO statistics related to use of a primary storage array global memory by a first set of host processes on the primary storage array, and collecting, at the primary storage array, primary array RDR process IO statistics related to use of the primary storage array global memory by a first RDR process on the primary storage array, and transmitting the primary array RDR process IO statistics from the primary storage array to the backup storage array. The method also includes collecting, at the backup storage array, backup array host process IO statistics related to use of a backup storage array global memory by a second set of host processes on the backup storage array, collecting, at the backup storage array, backup array RDR process IO statistics related to use of the backup storage array global memory by a second RDR process on the backup storage array, and transmitting the backup array RDR process IO statistics from the backup storage array to the primary storage array. The method also includes using the primary array host process IO statistics, primary array RDR process IO statistics, and backup array RDR process IO statistics, as input to a global memory segmentation algorithm, to determine a first global memory segmentation policy to be implemented on the global memory of the primary storage array, and using the backup array host process IO statistics, primary array RDR process IO statistics, and backup array RDR process IO statistics, as input to the global memory segmentation algorithm, to determine a second global memory segmentation policy to be implemented on the global memory of the backup storage array.

In some embodiments, the global memory segmentation algorithm is configured to determine the global memory segmentation policy based on input workload characteristics on global memory, the workload characteristics on global memory being characterized by the host process IO statistics, primary array RDR process IO statistics, and backup array RDR process IO statistics.

In some embodiments, the first global memory segmentation policy specifies a relative size of a first mirrored policy region and a first unmirrored policy region to be implemented on the global memory of the primary storage array, and the second global memory segmentation policy specifies a relative size of a second mirrored policy region and a second unmirrored policy region to be implemented on the global memory of the primary storage array.

In some embodiments, the first global memory segmentation policy specifies a first set of sizes of a first set of IO Pools to be implemented within the first mirrored policy region and a second set of sizes of a second set of IO Pools to be implemented within the first unmirrored policy region to be implemented on the global memory of the primary storage array, and the second global memory segmentation policy specifies a third set of sizes of a third set of IO Pools to be implemented within the second mirrored policy region and a fourth set of sizes of a fourth set of IO Pools to be implemented within the second unmirrored policy region to be implemented on the global memory of the primary storage array. In some embodiments, the first mirrored policy region and first unmirrored policy region have different sizes than the second mirrored policy region and second unmirrored policy region.

In some embodiments, transmitting the primary array RDR process IO statistics from the primary storage array to the backup storage array is implemented at regular time intervals, and transmitting the backup array RDR process IO statistics from the backup storage array to the primary storage array is implemented at the same time intervals as transmitting the primary array RDR process IO statistics from the primary storage array to the backup storage array.

In some embodiments, transmitting the primary array RDR process IO statistics from the primary storage array to the backup storage array is implemented at regular time intervals, and transmitting the backup array RDR process IO statistics from the backup storage array to the primary storage array is implemented by the backup storage array responsive to receipt of the primary RDR process IO statistics from the primary storage array.

In some embodiments, the IO statistics include requests by processes for slots of global memory. In some embodiments, the IO statistics include a number of slot allocation requests for slots of global memory of each available global memory slot size.

In some embodiments, a system for global memory segmentation adjustment incorporating remote data replication process workload requirements of a Remote Data Replication (RDR) facility, the RDR facility including a primary storage array and a backup storage array, includes one or more processors and one or more storage devices storing instructions that are operable, when executed by the one or more processors, to cause the one or more processors to perform operations including collecting, at the primary storage array, primary array host process IO statistics related to use of a primary storage array global memory by a first set of host processes on the primary storage array, collecting, at the primary storage array, primary array RDR process IO statistics related to use of the primary storage array global memory by a first RDR process on the primary storage array, and transmitting the primary array RDR process IO statistics from the primary storage array to the backup storage array. The operations further include collecting, at the backup storage array, backup array host process IO statistics related to use of a backup storage array global memory by a second set of host processes on the backup storage array, collecting, at the backup storage array, backup array RDR process IO statistics related to use of the backup storage array global memory by a second RDR process on the backup storage array, and transmitting the backup array RDR process IO statistics from the backup storage array to the primary storage array. The operations further include using the primary array host process IO statistics, primary array RDR process IO statistics, and backup array RDR process IO statistics, as input to a global memory segmentation algorithm, to determine a first global memory segmentation policy to be implemented on the global memory of the primary storage array, and using the backup array host process IO statistics, primary array RDR process IO statistics, and backup array RDR process IO statistics, as input to the global memory segmentation algorithm, to determine a second global memory segmentation policy to be implemented on the global memory of the backup storage array.

In some embodiments, the global memory segmentation algorithm is configured to determine the global memory segmentation policy based on input workload characteristics on global memory, the workload characteristics on global memory being characterized by the host process IO statistics, primary array RDR process IO statistics, and backup array RDR process IO statistics.

In some embodiments, the first global memory segmentation policy specifies a relative size of a first mirrored policy region and a first unmirrored policy region to be implemented on the global memory of the primary storage array, and the second global memory segmentation policy specifies a relative size of a second mirrored policy region and a second unmirrored policy region to be implemented on the global memory of the primary storage array.

In some embodiments, the first global memory segmentation policy specifies a first set of sizes of a first set of IO Pools to be implemented within the first mirrored policy region and a second set of sizes of a second set of IO Pools to be implemented within the first unmirrored policy region to be implemented on the global memory of the primary storage array, and the second global memory segmentation policy specifies a third set of sizes of a third set of IO Pools to be implemented within the second mirrored policy region and a fourth set of sizes of a fourth set of IO Pools to be implemented within the second unmirrored policy region to be implemented on the global memory of the primary storage array. In some embodiments, the first mirrored policy region and first unmirrored policy region have different sizes than the second mirrored policy region and second unmirrored policy region.

In some embodiments, transmitting the primary array RDR process IO statistics from the primary storage array to the backup storage array is implemented at regular time intervals, and transmitting the backup array RDR process IO statistics from the backup storage array to the primary storage array is implemented at the same time intervals as transmitting the primary array RDR process IO statistics from the primary storage array to the backup storage array.

In some embodiments, transmitting the primary array RDR process IO statistics from the primary storage array to the backup storage array is implemented at regular time intervals, and transmitting the backup array RDR process IO statistics from the backup storage array to the primary storage array is implemented by the backup storage array responsive to receipt of the primary RDR process IO statistics from the primary storage array.

In some embodiments, the IO statistics include requests by processes for slots of global memory. In some embodiments, the IO statistics include a number of slot allocation requests for slots of global memory of each available global memory slot size.

BRIEF DESCRIPTION OF THE DRAWINGS

FIG. 5 is a flow chart of an example process of storage array global memory segmentation adjustment incorporating remote data replication process workload requirements on both arrays of a remote data replication facility, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
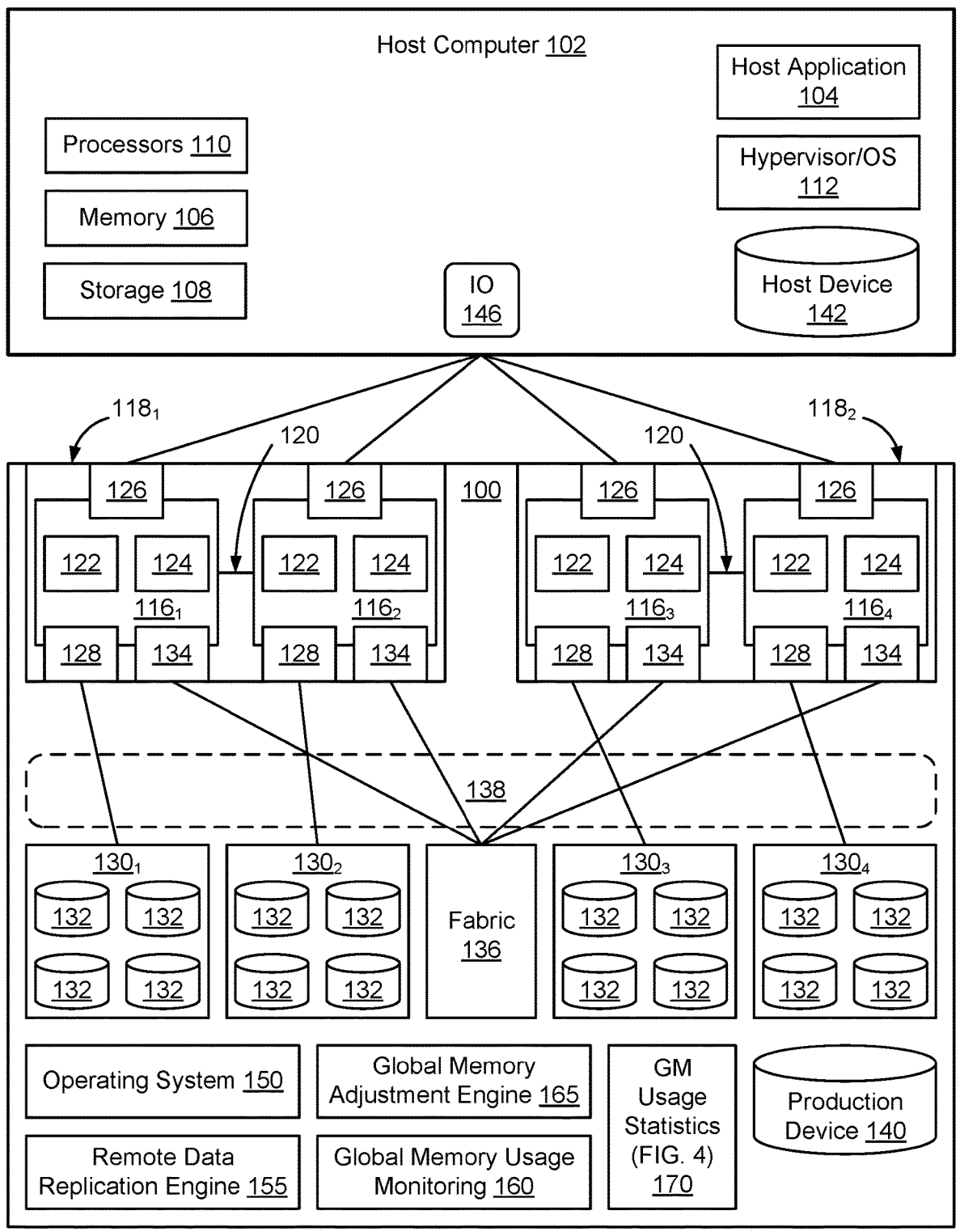
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a global memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible, then the IO 146 is sent to one of the compute nodes 116 to be serviced by the storage system 100.

In the case where IO 146 is a read command, the storage system 100 uses metadata to locate the commanded data, e.g., in the global memory 138 or on managed drives 132. If the commanded data is not in the global memory 138, then the data is temporarily copied into the global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the global memory 138, marks the data as dirty, and creates new metadata that maps the address of the data on the production device 140 to a location to which the block is written on the managed drives 132.

In some embodiments, the global memory is able to be allocated using slots of different sizes. Further, depending on the type of IO, the slots of global memory are either mirrored or unmirrored. For example, when a write IO is received by the storage engine 118 from a host 102, the write IO contains data that is not otherwise stored on the storage system 100. Accordingly, in some embodiments the compute nodes $116_1$, $116_2$, implement a mirrored policy on a portion of each compute nodes' high-speed memory 124, which results in the same data being written to both the high-speed memory $124_1$ of compute node $116_1$, and to high-speed memory $124_2$ of compute node $116_2$. This provides redundant copies of the data associated with a write IO such that, if one of the compute nodes fails, the other compute node still has a copy of the data stored in other storage resources. Implementing a mirrored policy on regions of the high-speed memory 124 is therefore important in connection with processing write IOs from the host 102.

When a read IO is received from a host 102, the read IO requests data that is already stored on the storage system. Accordingly, when the read IO is processed by one of the compute nodes 116, the data does not need to be placed in a mirrored region of high-speed memory 124, since a copy of the data continues to reside in back-end storage resources 130. By applying an unmirrored policy to a portion of the regions of high-speed memory 124 it is therefore possible to increase the number of slots of high-speed memory 124 that are available to process IO operations on the storage engine 118.

In some embodiments the storage system 100 applies a global memory segmentation policy to global memory 138 that determines the relative proportion of global memory that should be allocated to the unmirrored policy region and to the mirrored policy region. The global memory segmentation policy 160 can change over time, to enable the configuration of global memory to be optimized based on current or forecast workloads on the storage system.

As used herein, the term "policy region" refers to a region of the high-speed memory 124 where a particular policy (mirrored policy or unmirrored policy) is applied. A given region of the high-speed memory will either have a "mirrored" policy applied to it or an "unmirrored" policy applied to it.

Within each policy region, the global memory is divided into IO pools, in which each IO pool is used to implement slots of global memory having a respective given slot size. Example slot sizes might include 16 KB, 32 KB, 64 KB, and 128 KB, although the particular slot sizes of a set of IO pools will depend on the particular implementation. Within each IO pool, the global memory is divided into Global Memory (GM) banks of fixed size. Example GM bank sizes might be, for example, 128 MB, 256 MB, 0.5 GB, although the particular sizes of a set of GM banks will depend on the particular implementation.

A global memory management system applies a dynamic global memory segmentation policy to the global memory to optimize use of global memory. For example, at time T1 the global memory segmentation policy might be to have 40% of global memory allocated to implement the mirrored policy region, and 60% of global memory allocated to implement the unmirrored policy region. At time T2 the global memory segmentation policy might change such that 50% of global memory is allocated to implement the mirrored policy region, and 50% of global memory is allocated to implement the unmirrored policy region. Global memory segmentation policy changes can also affect the size of each of the IO pools within a given policy region, and hence the number of GM banks that are used to implement each of the policy regions and each of the IO pools within each of the policy regions.

By dynamically changing the size of the policy regions of the high-speed memory, and dynamically adjusting the size of the IO pools, it is possible to greatly increase the number of slots that are able to be created within the high-speed memory, when compared with application of a fixed set of policy regions to the high-speed memories of the pairs of compute nodes of the storage engine. Accordingly, various algorithms have been developed that are configured to predict future workloads on the storage system, and dynamically change the configuration of global memory, for example by changing the proportion of the global memory that is allocated to the mirrored policy region vs the proportion of the global memory that is allocated to the unmirrored policy region. Algorithms have also been developed that are configured to dynamically change the IO pools within the policy regions to change the number of slots of particular sizes that are contained within each of the policy regions. Algorithms of this nature use workload characteristics of existing workloads on the global memory in a predictive manner to set global memory segmentation policy for an upcoming workload interval. An example process for determining global memory segmentation is described, for example, in U.S. Pat. No. 11,650,763, the content of which is hereby incorporated herein by reference. The techniques described herein are agnostic as to the particular algorithm 350 (see FIG. 3) that is used to determine the particular global memory segmentation policy, since any algorithm can be used as long as the algorithm bases the workload segmentation on workload characteristics and the same algorithm 350 is used on both the primary storage array R1 and backup storage array R2.

Figure 2:
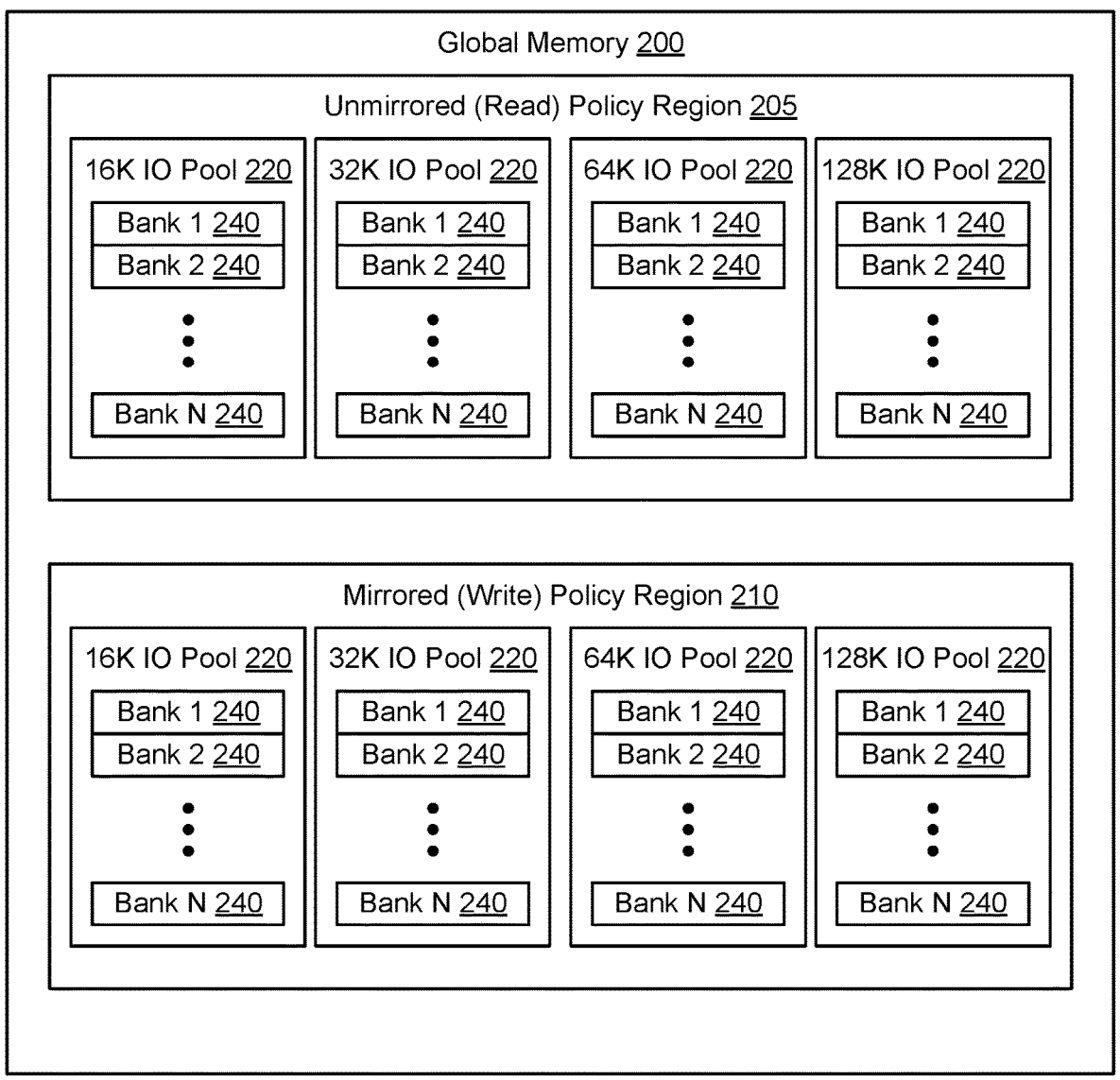
FIG. 2 is a block diagram of an example global memory having an unmirrored policy region and a mirrored policy region, with each policy region being divided into IO pools, each IO pool being implemented using a plurality of Global Memory (GM) banks, according to some embodiments.

FIG. 2 is a block diagram of an example global memory 200 having an unmirrored policy region 205 and a mirrored policy region 210, with each policy region being divided into IO pools 220, each IO pool being implemented using a plurality of Global Memory (GM) banks 240, according to some embodiments. As shown in FIG. 2, in some embodiments global memory 200 includes an unmirrored policy region 205 and a mirrored policy region 210. The unmirrored policy region 205 includes a plurality of IO pools 220, each IO pool being used to create slots having different respective slot sizes. FIG. 2 shows an example in which the unmirrored policy region 205 includes a first IO pool 220 that is used to create slots having slot size of 16 KB, a second IO pool 220 that is used to create slots having slot size of 32 KB, a third IO pool 220 that is used to create slots having slot size of 64 KB, and a fourth IO pool 220 that is used to create slots having slot size of 128 KB. Different embodiments might use IO pools to implement slot sizes different than those included in the example shown in FIG. 2. As shown in FIG. 2, in some embodiments the mirrored policy region 210 similarly is divided into a plurality of IO pools 220, each IO pool being used to create slots having different respective slot sizes. It should be understood that the particular number of IO pools within the mirrored policy region 210 and unmirrored policy region 205 will depend on the particular global memory segmentation policy and, accordingly, the configuration shown in FIG. 2 is merely intended as an example.

Within each IO pool, chunks of global memory referred to herein as Global Memory (GM) banks are used to implement the global memory allocation. Example GM bank sizes might be, for example, 128 MB, 256 MB, 512 MB, or some other chunk size. In some embodiments, GM banks form the minimum granularity for implementation of a global memory segmentation policy. When global memory segmentation policy changes are implemented, chunks of global memory at the granularity of the GM bank level are used to implement the policy change, by causing GM banks to be moved between policy regions or to cause GM banks to be moved between IO pools of a given policy region. In instances where a global memory segmentation policy change involves both changes in policy region size and changes in IO pools, a given GM bank may be moved from an IO pool that is being reduced in size in a first policy region, to an IO pool that is being increased in size in the second policy region in connection with the global memory segmentation policy change.

Figure 3:
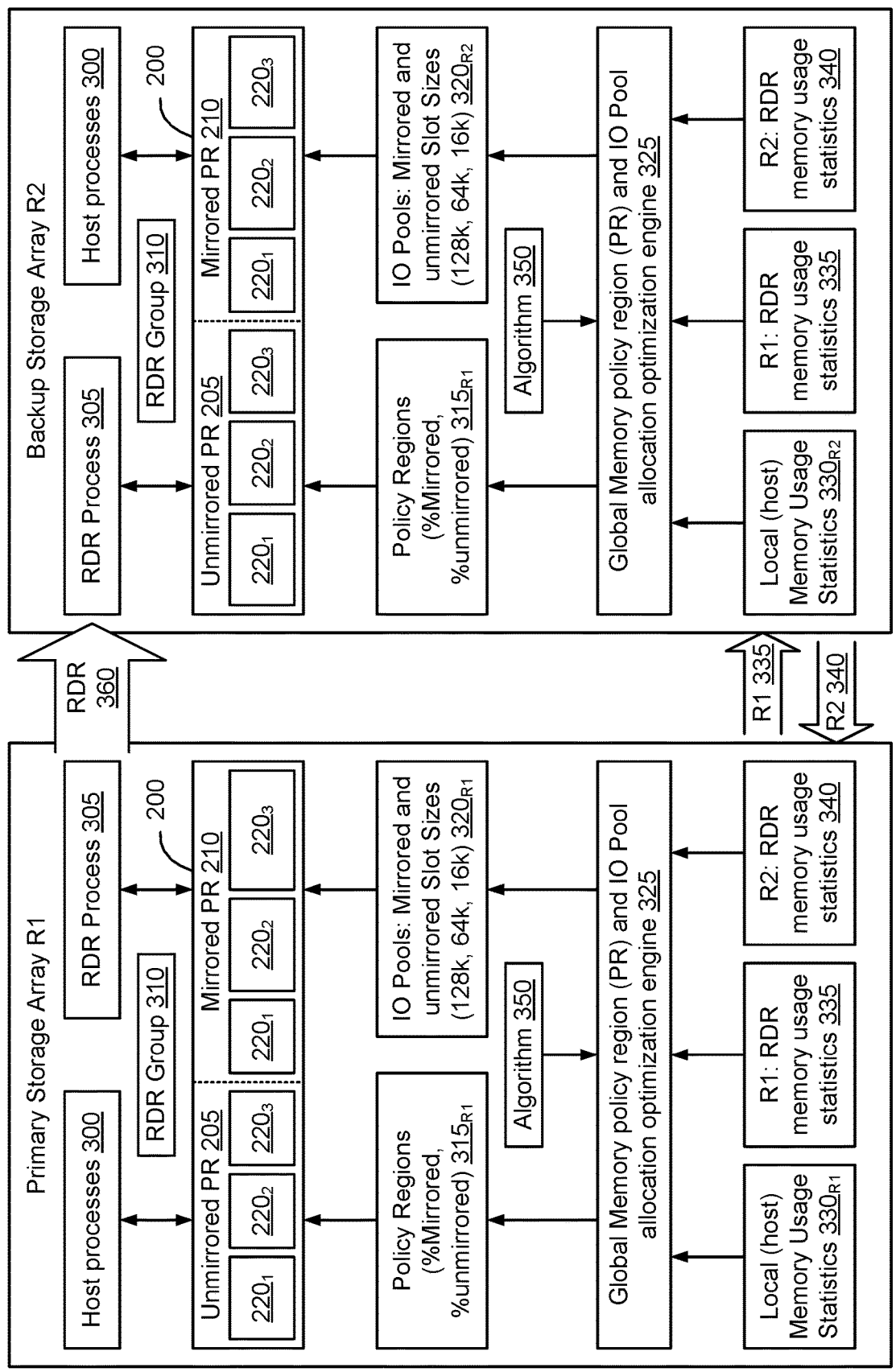
FIG. 3 is a block diagram of an example remote data facility including a primary storage array R1 and a backup storage array R2, according to some embodiments.

FIG. 3 is a block diagram of an example remote data facility including a primary storage array R1 and a backup storage array R2, according to some embodiments. As shown in FIG. 1, in some embodiments, the storage system 100 includes a remote data replication engine 155 configured to enable the storage system 100 to participate in one or more remote data replication facilities to enable data stored in storage resources 130 of the primary storage array R1 to be replicated to storage resources 130 of the backup storage array R2.

It is possible for a primary storage array R1 to perform data replication to a backup storage array R2 where the storage systems 100 are compatible and properly configured. The RDR application 155, when executed on storage system 100, enables the storage array 100 to participate in storage system level data replication between sets of mirroring pairs of storage systems 100. A set of storage arrays 100 that are configured for data to be mirrored from a primary storage array R1 to a backup storage array R2 will be referred to herein as a "Remote Data Replication Facility" 360. An example remote data replication facility is shown in FIG. 3. A given storage system, such as storage system 100, may operate as a primary storage array R1 or backup storage array R2 in many mirroring pairs, and hence multiple RDR applications 155 may simultaneously execute on storage system 100 to control participation of the storage system 100 in the mirroring operations of multiple remote data replication facilities 360.

In some embodiments, the Remote Data Replication engine 155 is configured to cause subsets of data stored within storage resources 132 of storage array 130 to be mirrored in real time (as IOs occur) by the storage system 100 to one or more similar backup storage systems 100. One example Remote Data Replication technology is used by Dell™ and referred to as Symmetrix Remote Data Facility, also referred to as SRDF or RDF. However, the embodiments described herein are not limited to implementations that uses SRDF as the remote data replication technology, as other synchronous or asynchronous remote data replication technologies may be used as well.

FIG. 3 is a block diagram of a remote data replication facility between a primary storage array R1 and a backup storage array R2, on which data of a Remote Data Replication (RDR) group 310 is replicated from the R1 to the R2 storage array, according to some embodiments. As used herein, the term RDR group 310 is used to refer to one or more storage groups that include logical devices that are replicated on a remote data replication facility 360. An example logical device, for example, might be production device 140.

When a write operation is received on a logical device contained in the RDR group 310 on the primary storage array R1, the write operation is mirrored using the remote data replication engine 155 to the backup storage array R2 on the remote data replication facility 360. Data transfer among storage systems 100, including transfers between storage arrays for data replication (mirroring) functions, may take place in several ways depending on how the primary storage array R1 handles data written by the host 102 and how the backup storage array R2 acknowledges receipt of data on the remote data replication facility. Two example data mirroring modes will be referred to herein as synchronous and asynchronous. Where data transfers occur between storage arrays 100, data transfer can take place over a communication network connecting the storage arrays 100, such as a Fibre Channel network or an Internet Protocol (IP) network.

In synchronous data replication mode, to maintain a synchronous relationship between the primary storage array R1 and the backup storage array R2, each IO from each host 102 is replicated by the primary storage array R1 to the backup storage array R2 as it is received from host 102, and the primary storage array R1 will wait for an acknowledgment from the backup storage array R2 before the primary storage array R1 acknowledges the write IO to the host 102.

In an asynchronous data replication mode, when data is received from a host 102, the data is written to the primary storage array R1 and a data transfer process is initiated to replicate the data to the backup storage array R2 on the remote data replication facility. The primary storage array R1 acknowledges the write operation to the host 102 before the primary storage array R1 has received an acknowledgement that the data has been received by the backup storage array R2. The use of asynchronous data replication enables the data on the primary storage array R1 and backup storage array R2 to be one or more cycles out of synchronization, because the primary storage array R1 will continue to execute IOs prior to receipt of acknowledgments from the backup storage array R2. The use of asynchronous replication may be beneficial in connection with sites located geographically distant from each other, for example where the distance between the primary storage array R1 and the backup storage array R2 is such that waiting for an acknowledgement from the backup storage array R2 would take considerable time and, hence, reduce responsiveness of the primary storage array R1 to the host 102.

As shown in FIG. 3, in some embodiments the primary storage array R1 includes a plurality of host processes 300 that are implementing host IO operations using global memory 200. The RDR process 305 is likewise implementing IO operations on global memory on the primary storage array R1 to implement the RDR facility 360, for example in connection with replicating data to the backup storage array R2. Likewise, the backup storage array R2 includes a plurality of host processes 300 that are locally implementing host IO operations using the global memory 200 of the backup storage array R2. The RDR process 305 on the backup storage array R2 is likewise implementing IO operations on global memory of the backup storage array R2.

Each IO operation is associated with a slot allocation request that causes allocation of a particular slot of global memory within one of the policy regions and within one of the IO pools. Global Memory usage statistics 170 are collected by a global memory usage monitor 160, and used by a global memory adjustment engine 165 to adjust the size of the policy regions 205, 210, and to adjust the size of the IO pools $220_1$, $220_2$, $220_3$, within each of the policy regions. In FIG. 3, the global memory adjustment engine 165 of FIG. 1 is implemented as global memory policy region and IO allocation optimization engine 325, which uses algorithm 350 to implement global memory segmentation policies on the respective storage array.

According to some embodiments, the primary storage array R1 collects R1 RDR process global memory usage statistics 335 by RDR processes 305 on the global memory 200 of the primary storage array R1, and periodically, for example every four hours, transmits the R1 RDR process global memory usage statistics 335 to the backup storage array R2. Similarly, the backup storage array R2 collects R2 RDR process global memory usage statistics 340 by RDR processes 305 on the global memory 200 of the remote storage array R2, and periodically, for example every four hours, transmits the R2 RDR process global memory usage statistics 340 to the primary storage array R1. The RDR process global memory usage statistics 335, 340, may be transmitted on the RDR facility 360 or may be separately transmitted, depending on the implementation.

At the primary storage array R1, the global memory policy region and IO pool allocation optimization engine 325 uses local host process memory usage statistics $330_{R1}$, R1: RDR process global memory usage statistics 335, R2 RDR process global memory usage statistics 340, and the global memory adjustment algorithm 350, to determine an optimized global memory segmentation policy to be locally applied to global memory 200 within primary storage array R1.

At the backup storage array R2, the global memory policy region and IO pool allocation optimization engine 325 uses local host process memory usage statistics $330_{R2}$, R1: RDR process global memory usage statistics 335, R2 RDR process global memory usage statistics 340, and the global memory adjustment algorithm 350, to determine an optimized global memory segmentation policy to be locally applied to global memory 200 within backup storage array R2.

It should be noted that the global memory policy region and IO pool allocation optimization engine 325 on both the primary storage array R1 and the backup storage array R2 use the same algorithm 350 to determine the global memory segmentation policy that should be locally applied to their global memory 200.

As noted above, the techniques described herein are agnostic as to the particular algorithm 350 (see FIG. 3) that is used to determine the particular global memory segmentation policy, since any algorithm can be used as long as the algorithm bases the workload segmentation on workload characteristics and the same algorithm 350 is used on both the primary storage array R1 and backup storage array R2. Since the local host process memory usage statistics $330_{R1}$ on the primary storage array R1 might be different than the local host process memory usage statistics $330_{R2}$ on the backup storage array R2, as shown in FIG. 3, the same algorithm 350, when provided with different input statistics, might arrive at different policies on the primary storage array R1 and backup storage array R2. Accordingly, as shown in FIG. 3, in some embodiments it would be expected that the unmirrored and mirrored policy regions 205, 210 on the primary storage array R1 might have a different sizes than the unmirrored and mirrored policy regions 205, 210 on the backup storage array R2. Like within each policy region, the IO pool sizes $220_1$, $220_2$, $220_3$ may be different. However, by providing both the R1 and R2 RDR process global memory usage statistics 335, 340 as input to the algorithm 350 when calculating the sizes of the policy regions and IO pool sizes, it is possible to optimize the global memory segmentation policy on both the primary storage array R1 and backup storage array R2 to pre-configure the global memory to accommodate the RDR process workload in the event of failover or failback.

Specifically, by causing the algorithm 350 on both the primary storage array R1 and the backup storage array R2 to include global memory access statistics by the RDR processes on both storage arrays that are associated with the RDR facility 360, it is possible to pre-configuring the global memory segmentation policies on the primary and backup storage array to better accommodate the workload associated with the RDR facility in the event of a failover or failback.

For example, in the event of failover from the primary storage array R1 to the backup storage array R2, when the algorithm calculated the current global memory segmentation policy on the backup storage array R2, the memory usage statistics provided to the algorithm 350 already included the RDR process workload 335 of the RDR processes on primary storage array R1 in its calculations when setting the current global memory segmentation policy on the backup storage array R2. Thus, the global memory segmentation on the backup storage array R2 will be more closely configured to enable the backup storage array R2 to implement the RDR workload that is transferred from the primary storage array R1 to the backup storage array R2 in connection with the failover.

Likewise, in the event of failback from the backup storage array R2 to the primary storage array R1, when the algorithm calculated the current global memory segmentation policy on the primary storage array R1, the memory usage statistics provided to the algorithm 350 included the RDR process workload 340 of the RDR processes on the backup storage array R2 in its calculations when setting the current global memory segmentation policy on the primary storage array R1. Thus, the global memory segmentation on the primary storage array R1 will be more closely configured to enable the primary storage array R1 to implement the RDR workload that is transferred from the backup storage array R2 to the primary storage array R1 in connection with the failback.

Figure 4:
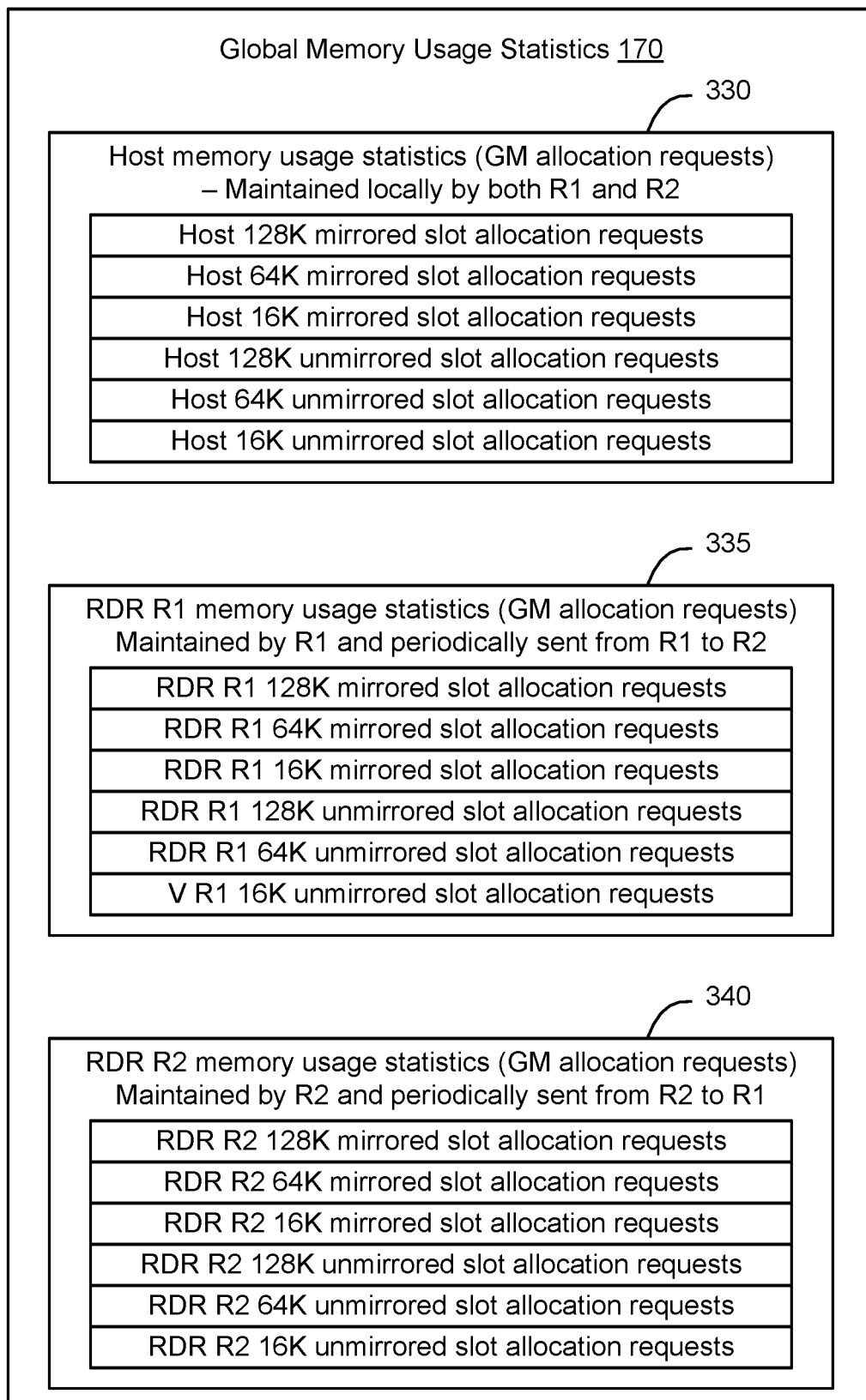
FIG. 4 is a block diagram of an example data structure containing host process memory usage statistics, R1 RDR process global memory usage statistics, and R2 RDR process global memory usage statistics, used by a global memory policy region and IO pool optimization engine to locally set a global memory segmentation policy, according to some embodiments.

FIG. 4 is a block diagram of an example data structure 170 containing host process memory usage statistics 330, R1 RDR process global memory usage statistics 335, and R2 RDR process global memory usage statistics 340, used by the global memory policy region and IO pool optimization engine 325, in connection with algorithm 350, to locally set a global memory segmentation policy, according to some embodiments. As shown in FIG. 4, in some embodiments example host process memory usage statistics 330 include global memory allocation requests during a preceding period of time that were serviced by the IO pools of each of the policy regions. In the example shown in FIG. 4, the global memory usage statistics include:

the number of host IO operations that were allocated slots of global memory from the 128 KB IO pool of the mirrored policy region;
the number of host IO operations that were allocated slots of global memory from the 64 KB IO pool of the mirrored policy region;
the number of host IO operations that were allocated slots of global memory from the 16 KB IO pool of the mirrored policy region;
the number of host IO operations that were allocated slots of global memory from the 128 KB IO pool of the unmirrored policy region;
the number of host IO operations that were allocated slots of global memory from the 64 KB IO pool of the unmirrored policy region; and
the number of host IO operations that were allocated slots of global memory from the 16 KB IO pool of the unmirrored policy region.

Similar global memory usage statistics 335 are independently collected for RDR process memory usage operations by the RDR process on the primary storage array R1. Similar global memory usage statistics 340 are collected for RDR process memory usage operations by the RDR process on the backup storage array R2 and transmitted by the backup storage array R2 to the primary storage array R1, and incorporated into the global memory usage statistics 400. The R1 host process memory usage statistics $330_{R1}$, RDR R1 process memory usage statistics 335, and RDR R2 process memory usage statistics 340 are all collectively used by global memory policy region and IO pool allocation optimization engine 325, in connection with algorithm 350, to determine a global memory segmentation policy $315_{R1}$, $320_{R1}$ to be applied to the global memory on the primary storage array R1. Likewise, on the backup storage array, the R2 host process memory usage statistics $330_{R2}$, RDR R1 process memory usage statistics 335, and RDR R2 process memory usage statistics 340 are all collectively used by global memory policy region and IO pool allocation optimization engine 325, in connection with the same algorithm 350, to determine a global memory segmentation policy $315_{R2}$, $320_{R2}$ to be applied to the global memory 200 on the backup storage array R2.

FIG. 5 is a flow chart of an example process of storage array global memory segmentation adjustment incorporating remote data replication process workload requirements on both arrays of a remote data replication facility, according to some embodiments. As shown in FIG. 5, both the primary storage array R1 and the backup storage array R2 will locally apply the same algorithm 350 to locally calculate a global memory segmentation policy to be applied to its respective global memory, while incorporating RDR process memory allocation statistics from both storage arrays R1 and R2 implementing the remote data replication facility 360. Many algorithms 350 may be used to create global memory segmentation policies depending on the particular implementation, and the invention is not limited to use of any particular algorithm 350, as long as the algorithm bases the workload segmentation on workload characteristics and the same algorithm 350 is used on both the primary storage array R1 and backup storage array R2.

Accordingly, as shown in FIG. 5, in some embodiments the primary storage array R1 collects host process memory usage statistics $330_{R1}$, such as slot allocation requests by hosts on the primary storage array R1 (block 500). The primary storage array R1 also collects R1 RDR process memory usage statistics 335, including global memory allocation requests made by the RDR process 155 on the primary storage array R1 (block 505). A determination is then made as to whether sufficient time has elapsed (block 510). In some embodiments, the R1 RDR process memory usage statistics 335 are periodically transmitted from the primary storage array R1 to the backup storage array R2.

Accordingly, a determination is made as to whether it is time to transmit the R1 RDR process memory usage statistics 335. In response to a determination that it is not time to transmit the R1 RDR process memory usage statistics 335 (a determination of NO at block 510), the process continues to collect R1 RDR process memory usage statistics 335 (block 505). In response to a determination that it is time to transmit the R1 RDR process memory usage statistics 335 (a determination of YES at block 510), the primary storage array R1 transmits the R1 RDR process memory usage statistics 335 to the backup storage array R2 (block 515). It should be noted that the primary storage array R1 only transmits the R1 RDR process memory usage statistics 335 in block 515 and does not transmit the R1 host process memory usage statistics $330_{R1}$ collected in block 500.

The same process is similarly implemented on the backup storage array R2. Specifically, as shown in FIG. 5, in some embodiments the backup storage array R2 collects host process memory usage statistics $330_{R2}$, such as slot allocation requests, by hosts on the backup storage array R2 (block 550). The backup storage array R2 also collects R2 RDR process memory usage statistics 340, including global memory allocation requests made by the RDR process 155 on the backup storage array R2 (block 555).

A determination is then made as to whether sufficient time has elapsed (block 560). In some embodiments, the R2 RDR process memory usage statistics 340 are periodically transmitted from the backup storage array R2 to the primary storage array R1. Accordingly, a determination is made as to whether it is time to transmit the R2 RDR process memory usage statistics 340. In response to a determination that it is not time to transmit the R2 RDR process memory usage statistics 340 (a determination of NO at block 560), the process continues to collect R2 RDR process memory usage statistics 340 (block 555). In response to a determination that it is time to transmit the R2 RDR process memory usage statistics 340 (a determination of YES at block 560), the backup storage array R2 transmits the R2 RDR process memory usage statistics 340 to the primary storage array R1 (block 565). It should be noted that the backup storage array R2 only transmits the R2 RDR process memory usage statistics 340 at block 565 and does not transmit the R2 host process memory usage statistics $330_{R2}$ collected in block 550.

Although FIG. 5 shows some embodiments in which both R1 and R2 independently transmit respective RDR process memory usage statistics 335, 340, it should be understood that other ways of periodically transmitting respective RDR process memory usage statistics may be implemented as well. For example, in some embodiments the backup storage array R2 may be configured to transmit its RDR process memory usage statistics 340 in response to receipt of the R1 RDR process memory usage statistics 335.

At the primary storage array R1, upon receipt of the R2 RDR process memory usage statistics 340 (block 520), the global memory policy region and IO pool allocation optimization engine 325 combines the received R2 RDR process memory usage statistics 340 with the locally generated R1 RDR process memory usage statistics 335 collected in block 505 and the host process memory usage statistics $330_{R1}$ collected in block 500, and uses algorithm 350 to locally calculate an updated global memory segmentation policy $315_{R1}$, $320_{R1}$ (block 525). The updated global memory segmentation policy is then locally applied within the primary storage array R1 to adjust the size of the unmirrored and mirrored policy regions 205, 210, and to adjust the size of the IO pools 220 within each of the policy regions (block 530).

At the backup storage array R2, upon receipt of the R1 RDR process memory usage statistics 335 (block 570), the global memory policy region and IO pool allocation optimization engine 325 combines the received R1 RDR process memory usage statistics 335 with the locally generated R2 RDR process memory usage statistics 340 collected in block 555 and the host process memory usage statistics $330_{R2}$ collected in block 550, and uses algorithm 350 to locally calculate an updated global memory segmentation policy $315_{R2}$, $320_{R2}$ (block 575). The updated global memory segmentation policy is then locally applied within the backup storage array R2 to adjust the size of the unmirrored and mirrored policy regions 205, 210, and to adjust the size of the IO pools 220 within each of the policy regions (block 580).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of dynamic global memory segmentation adjustment incorporating remote data replication process workload requirements comprising:

creating a Remote Data Replication (RDR) facility including a primary storage array having a primary storage array global memory and a backup storage array having a backup storage array global memory, the RDR facility being configured to replicate data from the primary storage array to the backup storage array;

automatically dynamically adjusting a first configuration of the primary storage array global memory and a second configuration of the backup storage array global memory, by periodically iteratively performing the steps of:

collecting, at the primary storage array, primary array host process IO statistics related to use of the primary storage array global memory by a first set of host processes on the primary storage array;

collecting, at the primary storage array, primary array RDR process IO statistics related to use of the primary storage array global memory by a first RDR process on the primary storage array;

collecting, at the backup storage array, backup array host process IO statistics related to use of the backup storage array global memory by a second set of host processes on the backup storage array;

collecting, at the backup storage array, backup array RDR process IO statistics related to use of the backup storage array global memory by a second RDR process on the backup storage array;

transmitting the primary array RDR process IO statistics from the primary storage array to the backup storage array;

transmitting the backup array RDR process IO statistics from the backup storage array to the primary storage array;

using the primary array host process IO statistics, primary array RDR process IO statistics, and backup array RDR process IO statistics, by a primary array global memory management system on the primary storage array, as input to a global memory segmentation algorithm executed by the primary array global memory management system, to determine a first global memory segmentation policy to be implemented on the primary storage array global memory;

applying the first global memory segmentation policy to the primary storage array global memory by the primary array global memory management system on the primary storage array, to adjust the first configuration of the primary storage array global memory according to the first global memory segmentation policy;

using the backup array host process IO statistics, primary array RDR process IO statistics, and backup array RDR process IO statistics, by a backup array global memory management system on the backup storage array, as input to the global memory segmentation algorithm executed by the backup array global memory management system, to determine a second global memory segmentation policy to be implemented on the backup storage array global memory; and applying the second global memory segmentation policy to the backup storage array global memory by the backup array global memory management system on the backup storage array, to adjust the second configuration of the backup storage array global memory according to the second global memory segmentation policy.

2. The method of claim 1, wherein the global memory segmentation algorithm used by the backup array global memory management system is the same as the global memory segmentation algorithm used by the primary array global memory management system, and is configured to determine the global memory segmentation policy based on input workload characteristics on global memory, the workload characteristics on global memory being characterized by the host process IO statistics, primary array RDR process IO statistics, and backup array RDR process IO statistics.

3. The method of claim 1, wherein the first global memory segmentation policy specifies a relative size of a first mirrored policy region and a first unmirrored policy region to be implemented on the primary storage array global memory;

wherein applying the first global memory segmentation policy comprises creating the first mirrored policy region in the primary storage array global memory and creating the first unmirrored policy region in the primary storage array global memory according to the relative size of the first mirrored policy region and the first unmirrored policy region specified by the first global memory segmentation policy;

wherein the second global memory segmentation policy specifies a relative size of a second mirrored policy region and a second unmirrored policy region to be implemented on the backup storage array global memory; and wherein applying the second global memory segmentation policy comprises creating the second mirrored policy region in the backup storage array global memory and creating the second unmirrored policy region in the backup storage array global memory according to the relative size of the second mirrored policy region and the second unmirrored policy region specified by the second global memory segmentation policy.

4. The method of claim 3, wherein the first global memory segmentation policy specifies a first set of sizes of a first set of IO Pools to be implemented within the first mirrored policy region and a second set of sizes of a second set of IO Pools to be implemented within the first unmirrored policy region to be implemented on the primary storage array global memory;

wherein applying the first global memory segmentation policy comprises creating the first set of IO pools within the first mirrored policy region in the primary storage array global memory and creating the second set of IO pools within the first unmirrored policy region in the primary storage array global memory according to the first global memory segmentation policy;

wherein the second global memory segmentation policy specifies a third set of sizes of a third set of IO Pools to be implemented within the second mirrored policy region and a fourth set of sizes of a fourth set of IO Pools to be implemented within the second unmirrored policy region to be implemented on the backup storage array global memory; and wherein applying the second global memory segmentation policy comprises creating the third set of IO pools within the second mirrored policy region in the backup storage array global memory and creating the fourth set of IO pools within the second unmirrored policy region in the backup storage array global memory according to the second global memory segmentation policy.

5. The method of claim 3, wherein the first mirrored policy region and first unmirrored policy region have different sizes than the second mirrored policy region and second unmirrored policy region.

6. The method of claim 1, wherein transmitting the primary array RDR process IO statistics from the primary storage array to the backup storage array is implemented at regular time intervals; and
  wherein transmitting the backup array RDR process IO statistics from the backup storage array to the primary storage array is implemented at the same time intervals as transmitting the primary array RDR process IO statistics from the primary storage array to the backup storage array.

7. The method of claim 1, wherein transmitting the primary array RDR process IO statistics from the primary storage array to the backup storage array is implemented at regular time intervals; and
  wherein transmitting the backup array RDR process IO statistics from the backup storage array to the primary storage array is implemented by the backup storage array responsive to receipt of the primary RDR process IO statistics from the primary storage array.

8. The method of claim 1, wherein the IO statistics comprise requests by processes for slots of global memory.

9. The method of claim 8, wherein the IO statistics comprise a number of slot allocation requests for slots of global memory of each available global memory slot size.

10. A system for dynamic global memory segmentation adjustment incorporating remote data replication process workload requirements, comprising:
  one or more processors and one or more storage devices storing instructions that are operable, when executed by the one or more processors, to cause the one or more processors to perform operations comprising:
  creating a Remote Data Replication (RDR) facility including a primary storage array having a primary storage array global memory and a backup storage array having a backup storage array global memory, the RDR facility being configured to replicate data from the primary storage array to the backup storage array;
  automatically dynamically adjusting a first configuration of the primary storage array global memory and a second configuration of the backup storage array global memory, by periodically iteratively performing the steps of:
    collecting, at the primary storage array, primary array host process IO statistics related to use of the primary storage array global memory by a first set of host processes on the primary storage array;
    collecting, at the primary storage array, primary array RDR process IO statistics related to use of the primary storage array global memory by a first RDR process on the primary storage array;
    collecting, at the backup storage array, backup array host process IO statistics related to use of the backup storage array global memory by a second set of host processes on the backup storage array;
    collecting, at the backup storage array, backup array RDR process IO statistics related to use of the backup storage array global memory by a second RDR process on the backup storage array;
    transmitting the primary array RDR process IO statistics from the primary storage array to the backup storage array;
    transmitting the backup array RDR process IO statistics from the backup storage array to the primary storage array;
    using the primary array host process IO statistics, primary array RDR process IO statistics, and backup array RDR process IO statistics, by a primary array global memory management system on the primary storage array, as input to a global memory segmentation algorithm executed by the primary array global memory management system, to determine a first global memory segmentation policy to be implemented on the primary storage array global memory;
    applying the first global memory segmentation policy to the primary storage array global memory by the primary array global memory management system on the primary storage array, to adjust the first configuration of the primary storage array global memory according to the first global memory segmentation policy;
    using the backup array host process IO statistics, primary array RDR process IO statistics, and backup array RDR process IO statistics, by a backup array global memory management system on the backup storage array, as input to the global memory segmentation algorithm executed by the backup array global memory management system, to determine a second global memory segmentation policy to be implemented on the backup storage array global memory; and
    applying the second global memory segmentation policy to the backup storage array global memory by the backup array global memory management system on the backup storage array, to adjust the second configuration of the backup storage array global memory according to the second global memory segmentation policy.

11. The system of claim 10, wherein the global memory segmentation algorithm used by the backup array global memory management system is the same as the global memory segmentation algorithm used by the primary array global memory management system, and is configured to determine the global memory segmentation policy based on input workload characteristics on global memory, the workload characteristics on global memory being characterized by the host process IO statistics, primary array RDR process IO statistics, and backup array RDR process IO statistics.

12. The system of claim 10, wherein the first global memory segmentation policy specifies a relative size of a first mirrored policy region and a first unmirrored policy region to be implemented on the primary storage array global memory;
  wherein applying the first global memory segmentation policy comprises creating the first mirrored policy region in the primary storage array global memory and creating the first unmirrored policy region in the primary storage array global memory according to the relative size of the first mirrored policy region and the first unmirrored policy region specified by the first global memory segmentation policy;
  wherein the second global memory segmentation policy specifies a relative size of a second mirrored policy region and a second unmirrored policy region to be implemented on the backup storage array global memory; and wherein applying the second global memory segmentation policy comprises creating the second mirrored policy region in the backup storage array global memory and creating the second unmirrored policy region in the backup storage array global memory according to the relative size of the second mirrored policy region and the second unmirrored policy region specified by the second global memory segmentation policy.

13. The system of claim 12, wherein the first global memory segmentation policy specifies a first set of sizes of a first set of IO Pools to be implemented within the first mirrored policy region and a second set of sizes of a second set of IO Pools to be implemented within the first unmirrored policy region to be implemented on the primary storage array global memory;

wherein applying the first global memory segmentation policy comprises creating the first set of IO pools within the first mirrored policy region in the primary storage array global memory and creating the second set of IO pools within the first unmirrored policy region in the primary storage array global memory according to the first global memory segmentation policy;

wherein the second global memory segmentation policy specifies a third set of sizes of a third set of IO Pools to be implemented within the second mirrored policy region and a fourth set of sizes of a fourth set of IO Pools to be implemented within the second unmirrored policy region to be implemented on the backup storage array global memory; and wherein applying the second global memory segmentation policy comprises creating the third set of IO pools within the second mirrored policy region in the backup storage array global memory and creating the fourth set of IO pools within the second unmirrored policy region in the backup storage array global memory according to the second global memory segmentation policy.

14. The system of claim 12, wherein the first mirrored policy region and first unmirrored policy region have different sizes than the second mirrored policy region and second unmirrored policy region.

15. The system of claim 10, wherein transmitting the primary array RDR process IO statistics from the primary storage array to the backup storage array is implemented at regular time intervals; and wherein transmitting the backup array RDR process IO statistics from the backup storage array to the primary storage array is implemented at the same time intervals as transmitting the primary array RDR process IO statistics from the primary storage array to the backup storage array.

16. The system of claim 10, wherein transmitting the primary array RDR process IO statistics from the primary storage array to the backup storage array is implemented at regular time intervals; and wherein transmitting the backup array RDR process IO statistics from the backup storage array to the primary storage array is implemented by the backup storage array responsive to receipt of the primary RDR process IO statistics from the primary storage array.

17. The system of claim 10, wherein the IO statistics comprise requests by processes for slots of global memory.

18. The system of claim 17, wherein the IO statistics comprise a number of slot allocation requests for slots of global memory of each available global memory slot size.

* * * * *